(12) United States Patent
Nowakowski et al.

(10) Patent No.: US 8,414,954 B2
(45) Date of Patent: Apr. 9, 2013

(54) REDUCED SUGAR ELASTIC THIN SHEETED FOOD DOUGH

(75) Inventors: Christine Nowakowski, Plymouth, MN (US); James R. Borek, Burnsville, MN (US)

(73) Assignee: General Mills, Inc., Minneapolis, MN (US)

( * ) Notice: Subject to any disclaimer, the term of this patent is extended or adjusted under 35 U.S.C. 154(b) by 1816 days.

(21) Appl. No.: 11/146,799

(22) Filed: Jun. 7, 2005

(65) Prior Publication Data

US 2005/0281930 A1   Dec. 22, 2005

Related U.S. Application Data

(63) Continuation-in-part of application No. 11/114,485, filed on Apr. 26, 2004, now Pat. No. 8,119,174.

(60) Provisional application No. 60/565,450, filed on Apr. 26, 2004.

(51) Int. Cl.
*A23L 1/18* (2006.01)

(52) U.S. Cl.
USPC ........... 426/618; 426/549; 426/560; 426/619; 426/620; 426/621

(58) Field of Classification Search .................. None
See application file for complete search history.

(56) References Cited

U.S. PATENT DOCUMENTS

| | | | |
|---|---|---|---|
| D202,609 S | | 10/1965 | Weiss |
| 5,176,936 A | * | 1/1993 | Creighton et al. ............ 426/618 |
| RE36,067 E | * | 1/1999 | Ringe et al. ..................... 514/57 |
| 6,149,965 A | | 11/2000 | Lengerich et al. |
| 6,175,556 B1 | | 1/2001 | Allen, Jr. et al. |
| 6,746,702 B1 | | 6/2004 | Robie |
| 6,913,775 B2 | | 7/2005 | Ballman et al. |

OTHER PUBLICATIONS

Nov. 17 & 18, 1997, Zentralfachschule der Deutschen Süβwarenwirtschaft e.V., Snack-Tagung.

* cited by examiner

*Primary Examiner* — Lien Tran

(74) *Attorney, Agent, or Firm* — Everett G. Diedriks, Jr.; Gregory P. Kaihoi

(57) ABSTRACT

The present invention provides intermediate moisture low sugar food doughs fortified with sufficient levels of medium chain length polysaccharides to provide needed dough elasticity for use as intermediate dough products in the commercial preparation of finished packaged consumer food products. The food doughs contain less than 5% (dry weight basis) sugar(s) (mono- and di-saccharides). The food doughs contain about 1%-10% medium chain length polysaccharides having a degree of polymerization ranging from about 200-600. The doughs can range in moisture content from about 15-40%. The doughs maintain sufficient pliability to be sheeted into sheeted doughs having thicknesses ranging from about 0.1 to 0.5 mm in thickness. The sheeted doughs can be used to prepare finished breakfast cereal and snack food products.

19 Claims, No Drawings

REDUCED SUGAR ELASTIC THIN SHEETED FOOD DOUGH

CROSS-REFERENCES TO RELATED APPLICATIONS

This application is a continuation-in-part to U.S. Ser. No. 11/114,485 "Low Sugar PreSweetened Dry Coated Cereals and Methods of Preparation" filed Apr. 26, 2004 now U.S. Pat. No. 8,119,174 that claims the benefit of priority to U.S. Provisional Application Ser. No. 60/565,450, filed Apr. 26, 2004.

BACKGROUND OF THE INVENTION

The present invention relates to food products and to their methods of preparation. More particularly, the present invention relates to reduced sugar elastic thin sheeted food doughs and to their methods of preparation.

A variety of food products are fabricated from sheets or ribbons of sweetened food doughs. For example, a cooked cereal dough sweetened with about 15% sugar is formed into individual pieces that are then dried to form finished ready-to-eat ("RTE") or breakfast cereals. In particular, two well known and popular RTE cereal products are known that employ such preparation intermediate steps; namely Golden Grahams® and Cinnamon Toast Crunch® brand cereals. In the commercial production of such RTE cereal products, a moist cooked cereal dough sweetened with about 15% sucrose is generally continuously extruded into the form of a continuous rope that is conveyed to a sheet forming device that forms the rope (e.g., pressed) into a continuous thin (e.g., about 0.030 inch) sheet. Thereafter, the continuous sheet is conveyed to a slitter that cuts the sheet into a number of continuous ribbons. The ribbons are then continuously conveyed to and fed into piece forming devices (e.g., cutters) to form individual pieces. The individual pieces formed are then subsequently puffed or dried to form finished dried RTE cereal pieces.

During the rope conveying operation, the sheet forming step, the ribbon forming step, and as being fed to the piece forming device, the food dough is required to have a measure of elasticity without which the ribbons can tend to tear. If torn, then the production is interrupted while the ribbons are manually re-fed into or through the conveyance devices or to the piece forming apparatus. Since rope conveyance speeds can be on the order of 30 m/min, dough tearing can quickly lead to significant production losses. Also, re-threading the production line with such a fast moving stream is also difficult. Often the entire line must be slowed and then gradually brought up to full production speed. Such production rate changes can in turn lead to loss of steady-state production conditions resulting in loss of product quality or even total loss of product itself.

The properties of the intermediate food dough must be carefully controlled to balance various physical and compositional attributes. The doughs must be soft and sufficiently pliable yet not too wet to tear. Some degree of control of the dough properties can be obtained by controlling their moisture content and, importantly herein, their sugar(s) content. Sugars not only impart sweetness to the finished products but also importantly impart at least a portion of the desired elasticity to the dough intermediate state during production. For these particular products fabricated in this manner form cooked cereal doughs, a sugar level ranging from about 10-20% have long been used.

However, present trends in consumer foods favor finished products having lower levels of sugar(s). While cooked cereal dough products having such lower sugar levels are well known in other shapes and prepared using other techniques, it would be desirable to provide consumers with familiar shapes, flavors and brands of RTE cereals with which they are familiar that are nonetheless characterized by lower sugar levels.

Regrettably, simple reduction in the sugar levels leads to reductions in the elasticity in the food dough that results in markedly increasing the difficulty in commercial manufacture. Moreover, the food art directed towards sugar replacements emphasize principally obtaining taste equivalence to sugar and provides comparatively little guidance to obtaining not only taste equivalence but also equivalence in obtaining physical property equivalency such as maintaining elasticity on intermediate processing food doughs.

U.S. Ser. No. 11/114,485 teaches that improved low sugar RTE cereal products can be provided that comprise a cereal base fabricated from a low sugar cooked cereal dough and coated with a coating including a primer layer such as an edible oil and a particular low sugar particulate sweetener coating. The present invention provides an improvement in the provision of a cereal base fabricated from a low sugar cooked cereal dough that additionally includes minor amounts of a medium chain length polysaccharide. Inclusion of the medium chain length polysaccharide improves the elasticity of the cooked cereal dough from which the cereal base is prepared for improvements in the ease of commercial production of such products.

BRIEF SUMMARY OF THE INVENTION

The present invention provides intermediate moisture low sugar food doughs fortified with sufficient levels of medium chain length polysaccharides to provide needed dough elasticity for use as intermediate dough products in the commercial preparation of finished packaged consumer food products. The food doughs contain less than 5% (dry weight basis) sugar(s) (mono- and di-saccharides). The food doughs contain about 1%-10% medium chain length polysaccharides having a degree of polymerization ranging from about 200-600. The doughs can range in moisture content from about 15-40%.

In its method aspect, the present methods comprise providing an intermediate moisture low sugar food doughs fortified with about 1%-10% of medium chain length polysaccharides having an average DP3-20, wherein the doughs have a moisture content from about 15-40% and contain less than 10% sweeteners; and, forming the dough into a sheet or ribbon having a thickness of about 0.1 to 2 mm;

DETAILED DESCRIPTION OF THE INVENTION

The present invention relates to reduced sugar elastic thin sheeted food doughs and to their methods of preparation. Each of the product components as well as product use and attributes and methods of their preparation are described in detail below.

Throughout the specification and claims, percentages are by weight (dry weight basis) and temperatures in degrees Centigrade unless otherwise indicated. Each of the referenced patents and patent applications are incorporated herein by reference.

Broadly, the present invention finds use in connection with a wide variety of food doughs that in commercial production into consumer food products must be conveyed at high speeds through one or more intermediate forming steps. The present invention finds particular suitability for use in connection with low sugar cooked cereal or farinaceous doughs for the preparation of breakfast cereals or snack food products, as well as potato doughs for fabrication into shaped or fabricated potato chips, and to sheeted fruit snacks such as in sheet or roll form.

In the preferred embodiment, the present methods comprise a step of providing a hot cooked cereal dough that has a low sugar content and is at intermediate moisture and containing sufficient medium chain length polysaccharides to provide a workable dough capable of sheeting at high speeds having improved resistance to tearing.

Breakfast cereal products are well known and the art is replete with references that describe their formulation and methods of preparation. For example, suitable cooked cereal doughs and methods of preparation are described in U.S. Pat. No. 6,149,965 "Cereal Products with Inulin and method of Preparation" (issued Nov. 21, 2000 to Van Lengerich et al.).

Of course, cooked cereal doughs are well know in the RTE cereal art and the skilled artisan will have no difficulty selecting suitable formulation and techniques for preparing such cooked cereal doughs. As is well known, generally a cooked cereal dough can be prepared by blending various dry cereal ingredients together with water and cooking to gelatinize the starchy components and to develop a cooked flavor. The cooked material can also be mechanically worked to form a cooked cereal dough. The cooking and mechanical work can occur simultaneously or sequentially. The dry ingredients can also include various additives such as sugar(s), salt and mineral salts, e.g., trisodium phosphate, and starches. In addition to water, various liquid ingredients such as corn (maize) or malt syrups can be added The principle component (50-99%, preferably about 50% to 90%) of the present cooked cereal doughs embodiment is a starchy cereal(s). The starchy cereal component can comprise any conventionally employed starchy cereal or, synonymously, farinaceous material, for use in a ready-to-eat cereal. Exemplary suitable starchy cereals include cereal grains, cut grains, grits or flours from the major cereal grains such as wheat, rice, corn, oats, barley, rye, triticale and mixtures thereof. Other cereal grains can be supplied by such minor grains as triticale or by "heritage" grains such as spelt, kamut, quinoa and mixtures thereof. While not produced in large quantities, such heritage grains are especially popular among those interested in organic foods. The flours can be whole flours or flour fractions such as with the germ fraction or husk fraction removed or, alternatively, brans. Of course, the R-T-E cereal art is well developed and the skilled artisan will have no difficulty selecting suitable farinaceous materials for use herein.

By "nutritive carbohydrate sweeteners" is meant all free mono- and disaccharides (i.e., having a DP≦2) and is meant to include such common sweeteners such as glucose, fructose, lactose, and sucrose provided by such common ingredients including sucrose (whether white sugar or brown sugar), dextrose, corn syrups, corn syrup solids, invert syrup, molasses, honey, maple syrup, or molasses.

The present cooked cereal compositions essentially comprise about 1% to 10% by weight (dry basis), i.e., up to about 3 g/oz, of added medium chain length polysaccharides. By "medium chain length polysaccharides" is meant those food carbohydrate ingredients having an average degree of polymerization ("DP") ranging from about 3 to 20, preferably about 3-15. Selection of ingredients within this range has been found important to providing the desired physical properties of the cooked cereal dough in the intermediate stages of processing especially the sheeting preparation step. More specifically, the selected materials impart sufficient but not excessive degree of elasticity to the low sugar cooked cereal dough to allow being fed into the sheeting rolls without tearing.

While not wishing to be bound by the proposed theory, it is speculated herein that the cooked cereal dough is extruded at an initial moisture content and at a temperature about 120° C. As the dough is conveyed from the extruder to the sheeting rolls, the dough begins to loss moisture and to cool. As the dough cools, the dough changes physical properties and goes from a workable rubbery or plastic state to an "glassy" or stiffer state. Due to the complexity of the dough compositions, this glass transition is not at a specific temperature but is more in the nature of a temperature and moisture zone. However, in actual practice transition through the transition zone is rapid and if the dough is not sheeted within 10 seconds, the dough becomes unworkable. Specifically, the dough will resist being drawn into the sheeting rolls and can also tear as it is being fed from the sheeting rolls. The cooling effect is accererated by the rapid dough conveyance speed which typically ranges from about 30-85 cm/s (60-170 ft/min.).

Of course, since the transition appears to be at least in part temperature dependent, efforts have been made to reheat the dough intermediate the extruder and the sheeting rolls such as with radiation heaters immediately upstream of the sheeting rolls. Regrettably, such reheating efforts have yielded little positive effect on solving the tearing problem.

The problem of tearing is particularly severe for those RTE cereal products fabricated from low sugar cooked cereal doughs that involve sheeting the dough such as are of particular interest in the present invention.

Of course, RTE cereals fabricated from low sugar cooked cereal doughs are well known. However, in the methods of production of RTE products from such doughs, the dough is typically formed into pellets that are fed into flaking rolls not sheeting rolls to form continuous sheets. The problem addressed in the present invention is particular to those methods of production involving feeding a continuous rope of cooked cereal dough to sheeting rolls.

Moreover, in a preferred embodiment, the low sugar cooked cereal dough is a highly expanded dough rope prior to sheeting. Having the highly expanded quality is important to realizing the desired light eating texture and qualities of the finished product. In the preferred form, the cooked cereal dough is in the form of an expanded rope that has expanded from it is initial density (typically ranging from about 0.6 to about 1.0 g/cc; 40-60 lbs/ft$^3$) to an expanded density (typically ranging from about 0.03-0.15 g/cc.; 2-10 lbs/ft$^3$). The problems with dough rope tearing are particularly severe for such highly expanded (and thus delicate) dough ropes.

Suitable for use as the medium chain length polysaccharides are such materials as hydrogenated starch hydrolyzates, fructo or oligo saccharides, polydextrose and mixtures thereof. The skilled artisan will appreciate that not all hydrogenated starch hydrolyzates and/or polydextrose, for example, will have the particular DP value and thus might not be useful in the present invention. Particularly suitable for use herein are those oligosaccharides (e.g., medium chain length polysaccharides) having an average DP value ranging from about 3-15. Further these materials fail to make the dough rope or sheet more elastic.

Surprisingly, those like materials but having a DP outside of the herein described range are sub-functional for use herein to ameliorate the tearing problem. For example, certain food ingredients know for their plasticizing properties such as glycerol (DP=1) are such potent plasticizers than used even at low levels impart such excessive effect such as to cause to the expanded dough rope to fall apart at extruder exit temperatures and thus their use is to be minimized. Conversely, those materials having a DP in excess of 15.

Preferred materials for use as the medium chain length polysaccharides are poly dextrose, methyl cellulose, inulin, hydrogenated starch hydrolizates and mixtures thereof that are within the DP 3-15 range. Most preferred herein due to its balance of cost, properties, availability and convenience of use is inulin. One particular inulin material useful herein has an average molecular weight ranging from 1152 g-1476 (DP7-DP9) with a total molecular weight range from 180-3258 g (DP1-DP20). An exemplary inulin for use herein is powdered inulin/fructo-oligosaccharide containing a high level of shorter chain inulin molecules (DP3-DP20) available from Sensus America LLC (www.sensus.us) under the trade name Frutafit® CLR. Like materials are also commercially available from Orafti Active Food Ingredients (www.orafti.com) under the Raftilose® brand.

Better results in terms of balancing the dough handling efficacy, balanced with acceptable gastric distress attributes are obtained when the added medium chain length polysaccharides is present at a concentration range of from about 0.1 to 8% by dry weight of the cereal dough, preferably about 1 to 8%, and for best results about 5 to 8%. Since the natural medium chain length polysaccharides content of wheat can range from about 1 to 3%, the total medium chain length polysaccharides content of the finished product will be the sum of the natural or native medium chain length polysaccharides associated with the cereal constituents plus the added pure medium chain length polysaccharides.

In addition to the cereal starchy ingredient(s) and the medium chain length polysaccharides, the cooked cereal dough can additionally include a bulking ingredient to provide added fiber, and/or reduce the caloric value of the finished cereal product. The bulking agent can be used as a replacement for all or a portion of the flour. Bulking agents which can be used include, for example, maltodextrins, hemi cellulose, microcrystalline cellulose, and mixtures thereof. Generally, when a bulking agent is used, the bulking agent is blended with the cereal ingredient in amounts of up to about 20% by weight based upon the weight of the dough. In another variation, the bulking ingredient can include source of fiber, especially insoluble fiber. Corn bran, wheat bran, oat bran, rice bran, and mixtures thereof can be used to replace the cereal flour ingredient in whole or in part to produce a fiber-enriched product, to enhance color, or to affect texture. The bran may be included, for example, in amounts of up to about 20% by weight, based upon the weight of the dough. Generally the bran component will be included in amounts of about 1% to about 10% by weight, and preferably from about 1% to about 5% by weight, based upon the weight of the dough.

In particular, the present invention is particularly suited for use in connection with the preparation of the low sugar cereal base pieces fabricated from a cooked cereal dough described in U.S. Ser. No. 11/114,485. In the present invention, however, by a "low sugar" cooked cereal dough is meant a dough having 6% or less nutritive carbohydrate sweetening ingredients. In preferred form, the present low sugar cooked cereal doughs contain at least some nutritive carbohydrate sweetening ingredients ranging from about 0.5% to about 5%, more preferably about 1% to 5% nutritive carbohydrate sweeteners.

In the most preferred form and as described in more detail in U.S. Ser. No. 11/114,485, the cereal dough includes a mixture of 50-55% wheat flour, 25-35% rice flour, 6% sugars and the balance salt, fat, emulsifiers, flavors, vitamins, minerals, etc. In the preferred form, the present invention involves fortifying this formulation with about 1-10%, preferably about 4-8% of medium length polysaccharides, especially inulin, an forming the cooked cereal dough prepared there from into a thin sheet.

The present raw cereal components and other ingredients can be combined with moisture and cooked and worked to form the present cooked cereal doughs by conventional cooked cereal dough preparation methods. The total moisture addition is controlled to provide a cooked cereal comprising about 15 to 40% moisture, preferably about 15 to 33% moisture.

In a preferred embodiment for ready-to-eat cereals, the present cereal compositions are further essentially defined in part by low fat levels, i.e., the present cereals do not comprise added or absorbed fat. Thus, the total fat or lipid component is quite low. The fat content results from the native fat associated with the starchy cereal component(s). Permissible low fat additions can also result from adding emulsifiers and from vitamin or flavor addition. However, the total fat content of the cereal compositions should be less than about 3%, preferably less than about 2%. Preferably, the R-T-E cereal is substantially free of any fat or oil incorporated into the cooked cereal dough. Such "added fat" is to be distinguished from "absorbed fat" that is picked up during deep fat frying used to prepare finished snack products herein. In more preferred embodiments, R-T-E cereals are further characterized as free of any absorbed fat.

If desired, the present cereal dough composition can additionally include a variety of materials designed to improve the aesthetic, organoleptic or nutritional qualities of the cereal. These adjuvant materials can include vitamin and/or mineral fortification, colors, flavors, high potency sweetener(s), and mixtures thereof. The precise ingredient concentration in the present cereal composition will vary in known manner. Generally, however, such materials can each comprise about 0.01% to about 2% dry weight of the cereal composition. In one preferred form, the cereal can include calcium (See, for example, U.S. Ser. No. 10/275,444 "Food Products Fortified With Calcium And Method Of Preparation" (filed Apr. 21, 2001)

One especially useful material is common salt. Desirably, the salt comprises about 0.1 to 2%, preferably about 0.5 to 1.0% of the cereal composition.

Still another highly preferred ingredient is a malt syrup flavor ingredient. The malt syrup comprises about 1 to 8% (dry basis), preferably about 2 to 5%.

Fiber, especially insoluble fiber, is believed to adversely affect selected mineral and vitamin absorption. Accordingly, in highly preferred embodiments, in particular, the present R-T-E cereals can be fortified with bioavailable sources of calcium, iron, riboflavin and the like. These mineral fortifiers can be incorporated into the cereal compositions directly. It is also desirable to vitamin fortify the present R-T-E cereals, especially selected B vitamins, e.g., riboflavin. Conventional methods and techniques of vitamin fortification can be used herein. Due in part to their heat sensitivity, vitamin fortification is typically practiced by topical application to the R-T-E cereal and such a technique is preferred herein.

The cereal dough cooking can be practiced using a batch, atmospheric cooker and, in the preferred embodiment, a low pressure extruder cooker especially those equipped with a conditioner precooker, or a twin screw extruder. The cereal is cooked with steam and sufficient amounts of added water for times and at temperatures sufficient to gelatinize the cereal starch and to develop desired levels of cooked cereal flavor.

Thus, in one preferred embodiment, the medium chain length polysaccharides can be added to the cereal and other dry ingredients prior to cooking. The medium chain length polysaccharides bearing dry blend of cereal ingredients can then be combined with water, heated to cook and gelatinize the starchy constituents and mechanically worked to form a cooked cereal dough fortified with medium chain length polysaccharides.

While in the present invention finds particular suitability for use in connection with the preparation of RTE cereals, the invention also finds application for use in connection with the preparation of other food product types whose method of preparation involves the forming of food dough into a thin continuous sheet as an intermediate processing step. For example U.S. Pat. No. 6,746,702 "Method of Preparing a Snack Product from a Cooked Cereal Dough" (issued Jun. 8, 2004 to Steve Robbie) describes a snack prepared from a cooked cereal dough. The snack product can be in the form of a cornucopia shaped piece (see, for example, U.S. Pat. No. D 202,609 "Puffed Snack Food Product" issued Oct. 26, 1965 to Verne Weiss) such as using the device described in U.S. Pat. No. 6,174,556 "Dough Forming Apparatus And Methods" (issued Jan. 16, 2001 to Bornhorst, et al.). Such corn based puffed snack products are marketed worked wide under the Bugles trade mark.

The present invention can also be used in the production of other types of snack food products prepared from cereal doughs that involve sheeting the dough into continuous sheets, e.g., tortilla chips or fabricated potato chip like products.

In a preferred embodiment of preparing an RTE cereal, the extruded cooked cereal dough is in the form of one or more ropes is received by and conveyed by a take away continuous conveyor that feeds the rope to a sheeter. In preferred form, the take-away conveyor is oriented at an incline such as to allow the dough rope to fall from the end of the conveyor to be vertically fed into the sheeter.

The rope is then generally fed into a sheeter. The rope preferably can have a temperature of about 90-95° C. and a moisture content ranging from about 15-25%. While typically a sheeter is a pair of counter-rotating sheeting rolls other types of sheeter apparatus are well known. The sheeting rolls form the dough ropes into the form of a continuous sheet having a thickness ranging from about 0.1-2 mm (30 mils to 80 mils), preferably about 0.75 to 2 mm (750-2000 micrometer "μm"; ≈0.030-0.080 inch or 40-80 mils), and more preferably about 125 μm (0.050 inch). In one preferred form, one of the sheeting rolls includes corrugations while the other is smooth to provide surface texture to one face of the dough sheets.

Thereafter, the continuous sheets of cooked cereal dough are then fed to a slitter that forms the continuous sheet into continuous ribbons. Next, the continuous ribbons are fed to a cutter that cross cuts the ribbons to form individual pieces.

The present methods can further comprise the step of drying the shaped and sized individual pieces to form finished cereal products fortified with medium chain length polysaccharides. The skilled artisan will appreciate that the drying step depends in important part upon the desired end product. For example, for end products in the form of puffable half products or pellets for snack production, the drying step can be practiced to provide a finish moisture content of about 10 to 15%. However, when the desired end product is an R-T-E cereal, drying the pieces to these moisture contents can only be an intermediate or sub-step prior to, for example, toasting and puffing the pieces. These pieces can then be subjected to a finish or final drying step wherein the pieces are dried to final dried moisture contents of 1 to 4% such as by toasting. For example, the individual pieces can be further dried and then are puffed and toasted such as in a jet zone dryer (i.e. a type of fluidized bed hot air dryer) (e.g., to a density ranging from about 0.09 to 0.2 g/cc) to form dried RTE cereal pieces.

The cereal pieces, however formed, can optionally be provided with a topical sugar coating and subsequently dried to remove the added moisture from the sugar coating solution to form presweetened R-T-E finished cereal pieces. In other variations, an oil topical coating optionally with salt and/or flavors (e.g., sweeteners and cinnamon) is applied to form finished dried RTE cereal snack products. Both conventional sugar coatings and coatings employing high potency sweeteners, especially aspartame and potassium acesulfame, are known and can be used to provide presweetened cereals for use herein. In a preferred form, the sweetener coating is cinnamon flavored.

If employed, the topical sweetening is applied in sufficient amounts such that after drying to remove added moisture associated with the sugar coating solution, the sugar coating is present in a weight ratio of sugar coating to cereal base of about 1:100 to about 50:100, preferably 10:100 to about 40:100. Typically, the sugar coating solution will have a blend of sugars and will comprise about 4 to 20% moisture. When higher amounts of the sugar coating solution, particularly for those solutions employing higher moisture levels, the slurry coated cereal pieces may be subjected to a final drying step to remove the added moisture from the sugar coating to provide finished dried products having a moisture content of about 1 to 5%.

In still another variation, the pieces or pellets can be deep fat fried to form dried puffed fried finished cereal products fortified with medium chain length polysaccharides. Such dried puffed fried finished cereal pieces are especially desirable as fiber fortified snack products. Such products can absorb about 5 to 35% of frying fat during the drying and puffing step.

The finished products such as R-T-E cereal pieces so prepared can then be conventionally packaged for distribution and sale.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A method for preparing a low sugar sheeted food product, comprising the steps of:
    providing an intermediate moisture food dough fortified with about 1%-10% of medium chain length polysaccharides having an average DP3-20, wherein the dough has a moisture content from about 15-40% and 6% or less of a nutritive carbohydrate sweetener;
    extruding the dough into a rope; and,
    feeding the rope into sheeting rolls to form a sheet or ribbon without tearing the dough, wherein the food dough is fed substantially vertically to the sheeting rolls and has a feed-rate of about 30-85 cm/s through the sheeting rolls, with the sheet or ribbon having a thickness of about 0.1 to 2 mm.

2. The method of claim 1 wherein the medium chain length polysaccharides are selected from the group consisting of methyl cellulose, polydextrose, inulin, hydrogenated starch hydrolyzates and mixtures thereof.

3. The method of claim 2 wherein at least a portion of the medium chain length polysaccharides includes inulin.

4. The method of claim 3 wherein the medium chain length polysaccharides having an average DP3-15.

5. The method of claim 4 wherein the sheet or ribbon has a thickness ranging from about 0.75 to 2 mm.

6. The method of claim 5 wherein the food dough is a cooked cereal dough.

7. The method of claim 6 wherein the cooked cereal dough has about 0.5 to 5% of a nutritive carbohydrate sweetener.

8. The method of claim 7 wherein the food dough prior to sheeting has a density of ranging from 0.03-0.15 g/cc.

9. The method of claim 8 wherein the food dough prior to sheeting has a temperature of about 90-100° C.

10. The method of claim 1 wherein the sheet has a thickness of about 125 μm.

11. The method of claim 10 wherein the sheeting step is practiced on a pair of counter rotating sheeting rolls.

12. The method of claim 11 wherein one roll is smooth and another roll includes corrugations.

13. The method of claim 11 wherein the cooked cereal dough includes a mixture of wheat flour and rice flour.

14. The method of claim 1 additionally including the steps of:
   slitting the sheets to form ribbons;
   cutting the ribbons into individual pieces; and
   finish drying the pieces to form dried pieces.

15. The method of claim 14 additionally including the step of:
   applying a topical sweetener coating to the dried pieces.

16. The method of claim 1 wherein the food dough includes about 4%-6% medium chain length polysaccharides.

17. The method of claim 11, wherein the dough prior to sheeting has a moisture content ranging from about 15-25% and the food product is puffed.

18. The method of claim 14 further comprising forming the individual pieces into pellets and forming dried puffed pieces from the pellets.

19. A method for preparing a low sugar sheeted food product, comprising the steps of:
   providing an intermediate moisture food dough fortified with about 1%-10% of medium chain length polysaccharides having an average DP3-20, wherein the dough has a moisture content from about 15-40% and 6% or less of a nutritive carbohydrate sweetener;
   extruding the dough into a rope; and, within 10 seconds after extruding the dough, substantially vertically feeding the rope, at a feed-rate of about 30-85 cm/s and a temperature of about 90-100° C., into sheeting rolls to form, without tearing the dough, a sheet or ribbon having a thickness of about 0.1 to 2 mm.

* * * * *